(No Model.)
E. WILDI.
FLUX DISTRIBUTING MACHINE.
No. 585,493. Patented June 29, 1897.
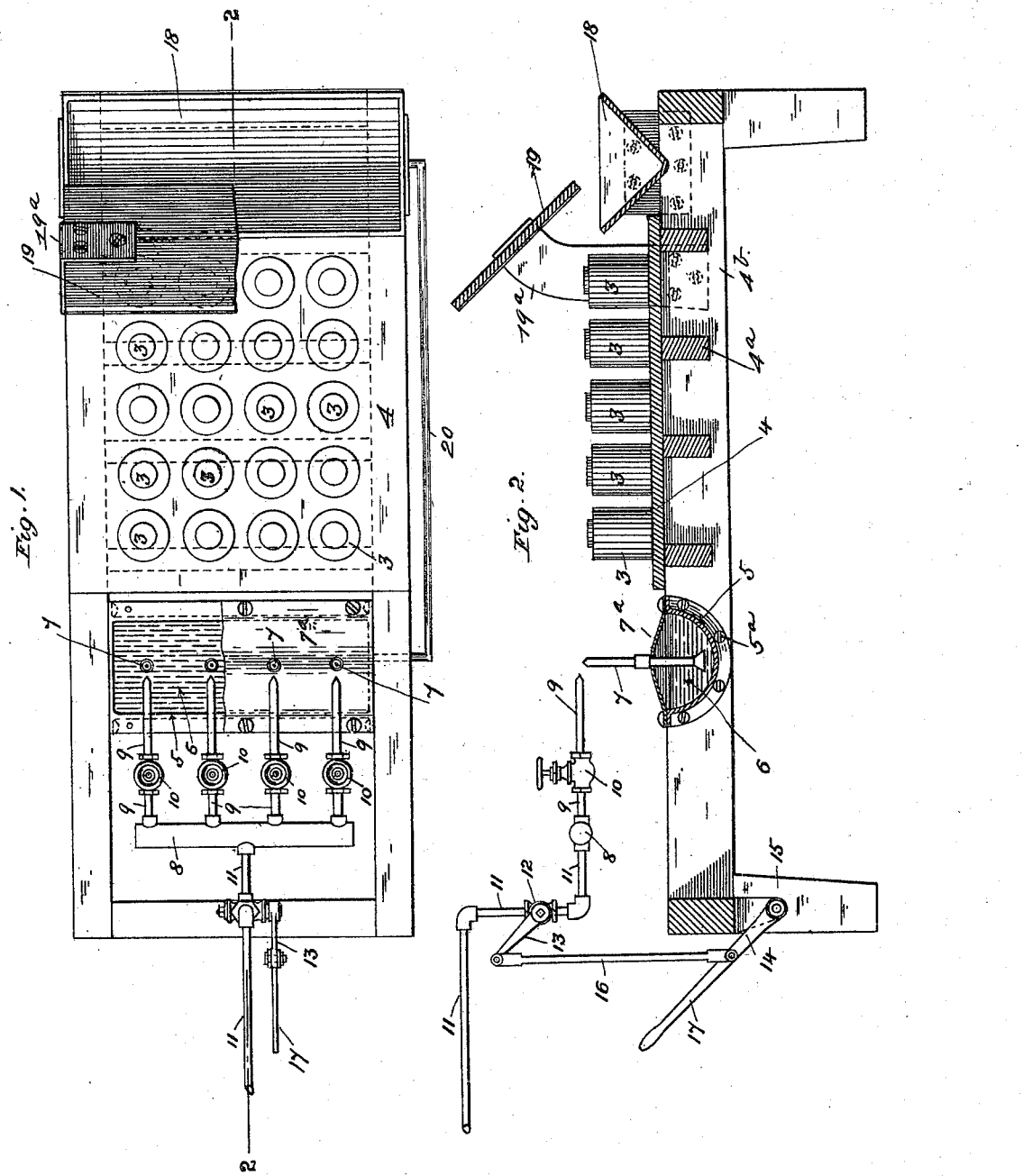

UNITED STATES PATENT OFFICE.

EMIL WILDI, OF HIGHLAND, ILLINOIS.

FLUX-DISTRIBUTING MACHINE.

SPECIFICATION forming part of Letters Patent No. 585,493, dated June 29, 1897.

Application filed December 7, 1896. Serial No. 614,778. (No model.)

*To all whom it may concern:*

Be it known that I, EMIL WILDI, of the city of Highland, Madison county, State of Illinois, have invented certain new and useful Improvements in Flux-Distributing Machines, of which the following is a full, clear, and exact description, reference being had to the accompanying drawings, forming a part hereof.

My invention relates to flux-distributing machines; and it consists in the novel construction, combination, and arrangement of parts hereinafter shown, described, and claimed.

Figure 1 is a top plan view of my improved flux-distributing machine. Fig. 2 is a vertical sectional view taken longitudinally of the machine and approximately on the line 2 2 of Fig. 1.

My improved flux-distributing machine is intended to be used for distributing flux upon a series of cans after they have been filled with the desired goods and the caps are to be soldered in position to seal the cans.

In carrying out the principles of my invention the cans 3 are arranged in rows or series upon a suitable tray 4, and the caps are placed in position upon the cans and are ready to be soldered. The tray 4 is placed upon the cross-pieces $4^a$ of the table $4^b$. The supply of flux 6 is placed in the trough 5, which is arranged transversely of the table and held in position between the side pieces of the table by means of the screws $5^a$, the upper edge of the trough 5 being substantially on a level with the tray 4 and at one end of said tray.

The short pipes 7 are mounted vertically through the cover $7^a$ of the trough 5, with their lower ends depending into and near the bottom of said trough. The upper ends of the pipes 7 are conical and have small apertures and are positioned slightly above the plane of the tops of the cans.

A pipe or drum 8, having its ends closed, is mounted in a horizontal position transversely of the table on a plane slightly above the upper ends of the pipes 7 and toward the end of the table from said pipes, which end is opposite the end occupied by the tray 4.

A series of nipples or short pipes 9 are tapped into the drum 8 and project in a horizontal position to points near the upper ends of the pipes 7. The free ends of said nipples are conical and have small apertures, which apertures are adjacent to the apertures in the pipes 7. Cut-off valves 10 are mounted in the nipples 9 to control the passage through said nipples as required to render the desired ones of said nipples inoperative while the remaining ones of said nipples are operative.

An air-pipe 11 leads from an air-pump or other suitable device for forcing air through said pipe to the drum 8, and a cut-off valve 12 controls the passage of air through said air-pipe 11. A lever 13 is attached to the valve 12 for operating the same. A lever 14 is attached to the frame 15 of the table, and a connecting-rod 16 connects the lever 14 with the lever 13, and upon the free end of the lever 14 is a handle 17 for operating said lever. The handle 17 may be operated either by the hand or foot of the operator.

When the handle 17 is depressed, the cut-off valve 12 is opened, allowing a blast of air to pass from the pipe 11 into the drum 8 and then through the ones of the nipples 9 which are open, and said blast of air, passing through the points of said nipples 9 over the ends of the pipes 7, forms an atomizer or sprayer and draws the flux 6 from the trough 5 upwardly through the pipes 7 and distributes said flux over the series of cans 3 upon the trays 4. The trough 18 is fixed to the opposite end of the table $4^b$ from the trough 5 and near to the position occupied by the tray 4, and the deflector 19 is placed at an incline with its lower edge above said trough 18 and its upper edge above the rear ones of the cans 3, and said deflector 19 is held in position by the posts $19^a$, the lower ends of which posts are attached to the side pieces of the table $4^b$. The spray of flux, which passes entirely over the cans, will strike the under side of the deflector 19 and will run down said deflector and drop into the trough 18. The pipe 20 enters the trough 18 at one end and near its bottom and extends along the side of the table and enters the trough 5, thus forming a passage leading the flux which accumulates in the trough 18 back into the trough 5 to be used again.

I claim—

1. In a flux-distributing machine, a suitable table, a flux-receptacle attached to said table, open-ended sections of pipe vertically mounted with their lower ends depending into said flux-receptacle, a drum mounted in a horizontal position transversely of and above said table, nipples projecting from said drum to positions near the upper ends of said vertical sections of pipe, and a pipe discharging air into said drum, substantially as specified.

2. In a flux-distributing machine, a suitable table, a flux-receptacle attached to said table, open-ended sections of pipe vertically mounted with their lower ends depending into said flux-receptacle, a drum mounted in a horizontal position transversely of and above said table, nipples projecting from said drum to positions near the upper ends of said vertical sections of pipe, cut-off valves controlling the passages through said nipples, and a pipe discharging air into said drum, substantially as specified.

3. In a flux-distributing machine, a suitable table, a flux-receptacle attached to said table, open-ended sections of pipe vertically mounted with their lower ends depending into said flux-receptacle, a drum mounted in a horizontal position transversely of and above said table, nipples projecting from said drum to positions near the upper ends of said vertical sections of pipe, a pipe discharging air into said drum, and a cut-off valve in said air-pipe for controlling the passage of air through said pipe, substantially as specified.

4. In a flux-distributing machine, a suitable table, a flux-receptacle attached to said table, open-ended sections of pipe vertically mounted with their lower ends depending into said flux-receptacle, a drum mounted in a horizontal position transversely of and above said table, nipples projecting from said drum to positions near the upper ends of said vertical sections of pipe, a pipe discharging air into said drum, an uncovered flux-receptacle mounted upon said table and at the opposite end thereof from the first-mentioned receptacle, and a deflector above said last-mentioned receptacle to catch the spray and conduct it into said last-mentioned receptacle, substantially as specified.

5. In a flux-distributing machine, a suitable table, a flux-receptacle attached to said table, open-ended sections of pipe vertically mounted with their lower ends depending into said flux-receptacle, a drum mounted in a horizontal position transversely of and above said table, nipples projecting from said drum to positions near the upper ends of said vertical sections of pipe, a pipe discharging air into said drum, an uncovered flux-receptacle mounted upon said table and at the opposite end thereof from the first-mentioned receptacle, a deflector above said last-mentioned receptacle to catch the spray and conduct it into said last-mentioned receptacle, and a pipe leading from said last-mentioned receptacle to the first-mentioned receptacle, substantially as specified.

In testimony whereof I affix my signature in presence of two witnesses.

EMIL WILDI.

Witnesses:
 EDWARD E. LONGAN,
 MAUD GRIFFIN.